US010356186B2

(12) United States Patent
Enoki et al.

(10) Patent No.: US 10,356,186 B2
(45) Date of Patent: Jul. 16, 2019

(54) METHOD, COMPUTER PROGRAM AND COMPUTER FOR ESTIMATING LOCATION BASED ON SOCIAL MEDIA

(71) Applicant: International Business Machines Corporation, Armonk, NY (US)

(72) Inventors: Miki Enoki, Tokyo (JP); Yohei Ikawa, Tokyo (JP); Michiaki Tatsubori, Tokyo (JP); Yuto Yamaguchi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/881,155

(22) Filed: Jan. 26, 2018

(65) Prior Publication Data

US 2018/0152527 A1    May 31, 2018

Related U.S. Application Data

(63) Continuation of application No. 15/178,677, filed on Jun. 10, 2016, now Pat. No. 9,954,960, which is a
(Continued)

(30) Foreign Application Priority Data

Oct. 30, 2012    (JP) ................................. 2012-239077

(51) Int. Cl.
*G06F 15/16*    (2006.01)
*H04L 29/08*    (2006.01)
(Continued)

(52) U.S. Cl.
CPC .......... *H04L 67/18* (2013.01); *G06F 16/9537* (2019.01); *H04L 51/32* (2013.01); *H04L 67/22* (2013.01); *H04L 67/306* (2013.01)

(58) Field of Classification Search
CPC ......... H04L 67/18; H04L 51/32; H04L 67/22; H04L 67/306; G06F 17/3087
(Continued)

(56) References Cited

U.S. PATENT DOCUMENTS

| 2012/0317104 | A1* | 12/2012 | Radlinski | .......... G06F 17/30867 |
| | | | | 707/724 |
| 2013/0315042 | A1* | 11/2013 | Kindel | ................. G04G 9/0076 |
| | | | | 368/10 |
| 2014/0012927 | A1* | 1/2014 | Gertzfield | .............. G06Q 50/01 |
| | | | | 709/206 |

FOREIGN PATENT DOCUMENTS

| JP | 2001-325199 A | 11/2001 |
| JP | 2003-006221 A | 1/2003 |

(Continued)

OTHER PUBLICATIONS

Cheng et al., "You are where you tweet: A content-based approach to geo-locating Twitter users", Porceedings of CIKM, Oct. 26-30, 2010, Toronto, Ontario, Canada.
(Continued)

*Primary Examiner* — Alan S Chou
(74) *Attorney, Agent, or Firm* — Scully, Scott, Murphy & Presser, P.C.; Vazken Alexanian (57) ABSTRACT

A system and method to estimate a location relating to a user who has not filled in information about the location in a profile field in social media such as a microblog. The system and method estimates association between a user in social media and a location includes the steps of acquiring a first content posted to the social media by a first user associated with a first location, determines regional localization of the first content on the basis of the first location, acquires a second content posted to the social media by a second user not associated with a location, determine the degree of a relationship between the first content and the second con-
(Continued)

tent, and associating the first location with the second user on the basis of the localization and the degree of the relationship.

20 Claims, 11 Drawing Sheets

Related U.S. Application Data continuation of application No. 14/067,178, filed on Oct. 30, 2013, now Pat. No. 9,380,121.

(51) Int. Cl.
*H04L 12/58* (2006.01)
*G06F 16/9537* (2019.01)
(58) Field of Classification Search
USPC ......................................................... 709/206
See application file for complete search history.

(56) References Cited

FOREIGN PATENT DOCUMENTS

| JP | 2003-242169 A | 8/2003 |
|---|---|---|
| JP | 2003-288299 A | 10/2003 |
| JP | 2004-507805 A | 3/2004 |
| JP | 2005-071027 A | 3/2005 |
| JP | 2007-079945 A | 3/2007 |
| JP | 2007-510364 A | 4/2007 |
| JP | 2008-003969 A | 1/2008 |
| JP | 2008-158564 A | 7/2008 |
| JP | 2010-517147 A | 5/2010 |
| JP | 2010-238237 A | 10/2010 |
| JP | 2012-500427 A | 1/2012 |
| WO | WO 03/079229 A1 | 9/2003 |

OTHER PUBLICATIONS

Clodoveu et al., "Evaluation of the quality of an online geocoding resource in the context of a large Brazilian city", Transactions in GIS, vol. 15, Issue 6, pp. 851-868, Dec. 2011.

Sakamaki et al., "User behavior pattern analysis using geo-tab of microblog", Information Processing Society of Japan, IEICE Technical Report, NLC2010-37, pp. 1-787-1-788, Jan. 2011.

Sakamaki et al., "Estimation of Human Behavior of a User using Geotaging of Microblogging", Abstract, IEICE Tech. Rep., vol. 110, No. 400, NLC2010-37, pp. 37-42, Jan. 2011.

* cited by examiner

METHOD, COMPUTER PROGRAM AND COMPUTER FOR ESTIMATING LOCATION BASED ON SOCIAL MEDIA

TECHNICAL FIELD

The present invention relates to an information processing technology and, in particular, to a technique to estimate a location related to a user in social media such as a microblog.

BACKGROUND ART

Social media has become widely used and along this widespread use has arisen a request to know locations related to users (for example residences or work places). For example, if a user sends disaster information, the location of the user can be quickly estimated and necessary measures can be taken. Furthermore, if the locations of users can be estimated, sales promotions targeted at each individual region will be possible. On the other hand, social media typically includes fields for users to fill in their profiles and make the user profiles public. However, only a small minority of users fill in their exact locations in the profile fields. For example, it has been reported that a little more than 20% of the users of a social media filled in their exact locations in the profile fields. Various approaches to circumventing the problem have been attempted. For example, an approach has been attempted in which latitude/longitude information called a geotag is added to information to be sent by users by using a GPS (Global Positioning System) function of a mobile device (see Non-patent Literature 3). Another technique has been proposed that analyzes a text in sent information to estimate a location from a geographical name contained in the text (see Patent Literatures 1 and 2).

A technique has been proposed that estimates the location of a user from regionality of words (words specific to a particular region and dialect) used in a posted text to estimate the location of the user (see Non-patent Literature 1). Another technique has been proposed that takes into consideration the relationship between users (follow/followed relationship) that is implemented in social media to estimate the location of a user on the assumption that regionality is reflected in the relationship (Non-patent Literature 2).

[Non-patent Literature 1] Cheng, et al. "You are where you tweet: A content-based approach to geo-locating Twitter users". In proceedings of CIKM, 2010.

[Non-patent Literature 2] Clodoveu, et al. "Evaluation of the quality of an online geocoding resource in the context of a large Brazilian city", Transactions in GIS, Volume 15, Issue 6, pp. 851-868, December 2011.

[Non-patent Literature 3] T. Sakamaki, et al. "User behavior pattern analysis using geo-tag of microblog", IEICE Technical Report, NLC 2010-37.

[Patent Literature 1] JP2010-517147A

[Patent Literature 2] JP2008-158564A

However, these approaches have the following problems and the effects of the approaches are limited. First, in reality, text in information with a geotag and information sent rarely contains geographical names. Estimation of based on regionality of words and regionality of relationship between users cannot be precise enough.

SUMMARY OF INVENTION

The present invention has been made in light of these problems and is based on the idea of identifying a "local event" that attracts attention in a regionally localized area and estimating that residence-unidentified users who have made a mention of that event is likely to be a resident of that area. One object of the present invention is to provide a technique to estimate a location relating to a user who has not filled in information about the location in a profile field in social media such as a microblog.

The present invention provides a method for estimating association between a user in social media and a location. The method includes the steps of acquiring a first content posted to the social media by a first user associated with a first location, determining regional localization of the first content on the basis of the first location, acquiring a second content posted to the social media by a second user not associated with a location, determining the degree of a relationship between the first content and the second content and associating the first location with the second user on the basis of the localization and the degree of the relationship.

The step of determining the localization may include the steps of computing a base distribution indicating a regional distribution of the first content randomly extracted, computing an event distribution indicating a regional distribution of the first content relating to a particular event, and determining regional localization of the first content on the basis of a difference between the base distribution and the event distribution.

The social media may include a profile associated with each user and the profile includes a location field and the step of computing the base distribution may include the steps of acquiring a placename filled in the location field associated with a user who posted the first content randomly extracted, referring to a placename dictionary indicating association between a placename and a pair of latitude and longitude to obtain a pair of latitude and longitude corresponding to the acquired placename on the basis of the acquired placename and identifying a single cell corresponding to the acquired pair of latitude and longitude among a plurality of cells into which an area of interest is divided in advance. The identified single cell may be the first location and the precision with which the area of interest is divided may be changeable.

The first content relating to the particular event may be the first content including a particular keyword. The particular keyword may be a keyword that has occurred a number of times that is greater than a predetermined threshold.

The social media may include a profile associated with each user, the profile includes a location field and the step of computing the event distribution may include the steps of acquiring a placename filled in the location field associated with a user who posted the first content relating to a particular event, referring to a placename dictionary indicating association between a placename and a pair of latitude and longitude to obtain a pair of latitude and longitude corresponding to the acquired placename on the basis of the acquired placename and identifying a single cell corresponding to the obtained pair of latitude and longitude among a plurality of cells into which an area of interest is divided in advance.

Here, the regional localization of the first content can be computed using a KL-divergence between the base distribution and the event distribution. The step of determining the degree of relationship may determine whether or not the first content and the second content are related to the same particular event and may determine whether or not the first content and the second content include the same particular keyword.

The step of associating may associate the first location with the second user if the degree of the localization is greater than a predetermined threshold. The step of associating may associate more strongly the first location with the second user in response to the degree of the localization being greater. Furthermore, the step of associating may associate the first location with the second location if the degree of the relationship is greater than a predetermined threshold. The step of associating may associate more strongly the first location with the second user in response to the degree of the relationship being greater.

The method may further include the step of, in response to a plurality of the first locations being associated with one single second user, estimating that the first location most often associated with the second user is a second location associated with the second user. The step of associating may further include the step of associating more strongly the first location with the second user in response to the degree of the relationship being greater and the degree of the localization being greater, and, in response to a plurality of the first locations being associated with one single second user, estimating that the first location most often associated with the second user is a second location associated with the second user.

The probability $P(l|u)$ that the second user u is associated with the first location l can be given by Formula 1, the probability $P(l|e)$ that a particular event e attracts attention of the first user u associated with the first location l can be given by Formula 2, and the probability $P(e|u)$ that the second user u has made a mention of the event e can be given by Formula 3.

Estimation of the probability that the user $u$ is a resident of the location $l$: [Formula 1]

$$P(l|u) = \sum_{e} P(l|e) \cdot P(e|u)$$

The probability that the event $e$ particularly attracts attention of users living in the location $l$: [Formula 2]

$$P(l|e) = \sum_{u \in U_{known}} P_0(l|u) \cdot P(u|e)$$

where $U_{known}$ is a set of users whose residence has been identified and $$P_0(l|u) = \begin{cases} 1 & \text{iff } u\text{'s location profile is } l \\ c & \text{iff } u\text{'s location profile is unknown} \\ 0 & \text{iff } u\text{'s location profile is not } l \end{cases}$$

The probability that the user $u$ has made a mention of the event $e$: [Formula 3]

$$P(e|u) = \begin{cases} \frac{1}{|E_u|} & \text{iff } \exists t \in T_e \cdot t \text{ is posted by } u \\ 0 & \text{otherwise} \end{cases}$$

where $T_e$ is a message concerning the event $e$ and $E_u$ is an event sent by the user $u$.

The content may be message that is sampled from messages posted to the social media on predetermined criteria. The message may be a message sampled on criteria including a given keyword from messages posted to the social media in a given time period. The social media may be a microblog.

The present invention when viewed as a computer program or a computer system can also include practically the same technical features as the technical features of the present invention when viewed as the method described above.

The present invention enables the location of a user in social media such as a microblog to be estimated with an improved degree of accuracy.

DESCRIPTION OF EMBODIMENTS

Embodiments

The best mode for carrying out the present invention will be described below in detail with reference to drawings. However, the embodiments described below are not intended to limit the present invention which is defined in the claims and not all combinations of features described in the embodiments are essential to the inventive solution. The present invention can be carried out in many different modes and should not be interpreted as being limited to the specifics in the descriptions of the embodiments. It should be noted that not all of the combinations of features described in the embodiments are essential to the inventive solution. Throughout the description of the embodiments, like elements are given like reference numerals (unless otherwise stated).

Figure 1:
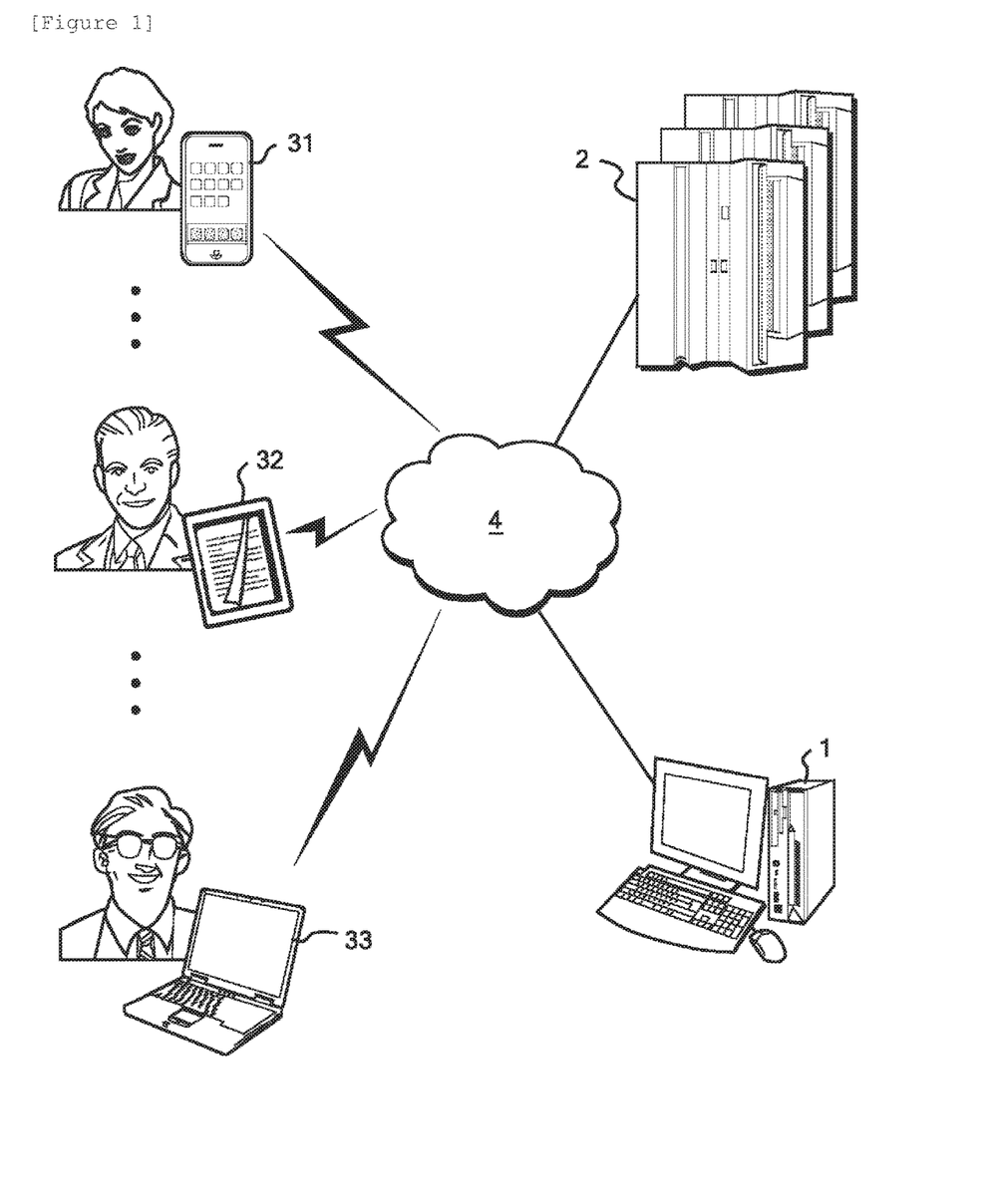
FIG. 1 is a conceptual diagram illustrating a microblog system.

FIG. 1 is a conceptual diagram illustrating a microblog system, which is an example of social media. The system includes a microblog server 2 and user terminals, which are interconnected through the Internet 4 so that they can communicate with each other. The user terminals may be computers of any types including a communication capability. For example, the user terminals may be mobile devices, such as a smartphone 31, a tablet 32, a (laptop) personal computer 33 depicted as well as a personal data assistant (PDA, personal digital assistant), an in-vehicle computer, and a netbook, which are not depicted.

Figure 2:
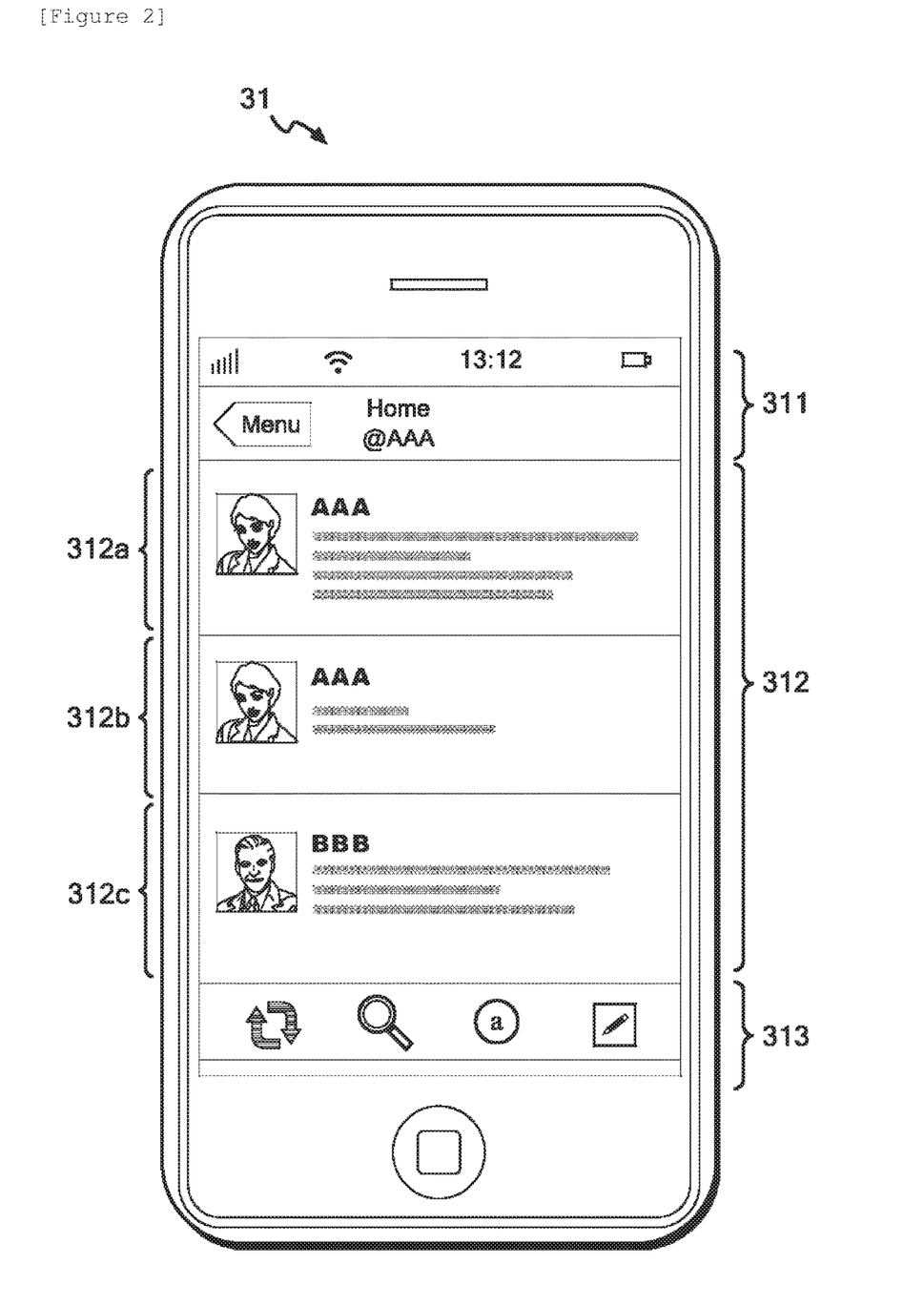
FIG. 2 is a diagram illustrating a smartphone functioning as a user terminal and its display screen.

FIG. 2 illustrates, as one example, a smartphone 31, which is a user terminal, and its display screen. A microblog application screen is displayed on the touch screen of the smartphone 31. The application screen is split into three sections: a home section 311, a timeline section 312 and an operation section 313, from top to bottom. Displayed in the menu section are a menu button and an indication that the timeline section 312 is the timeline of user AAA. Displayed in the timeline section 312 are message fields 312a and 312b of user AAA and a message field 312c of user BBB (who is following user AAA), from top to bottom. The message fields 312a to 312c are displayed in chronological order. That is, the message field 312a at the top corresponds to the latest message.

Figure 3:
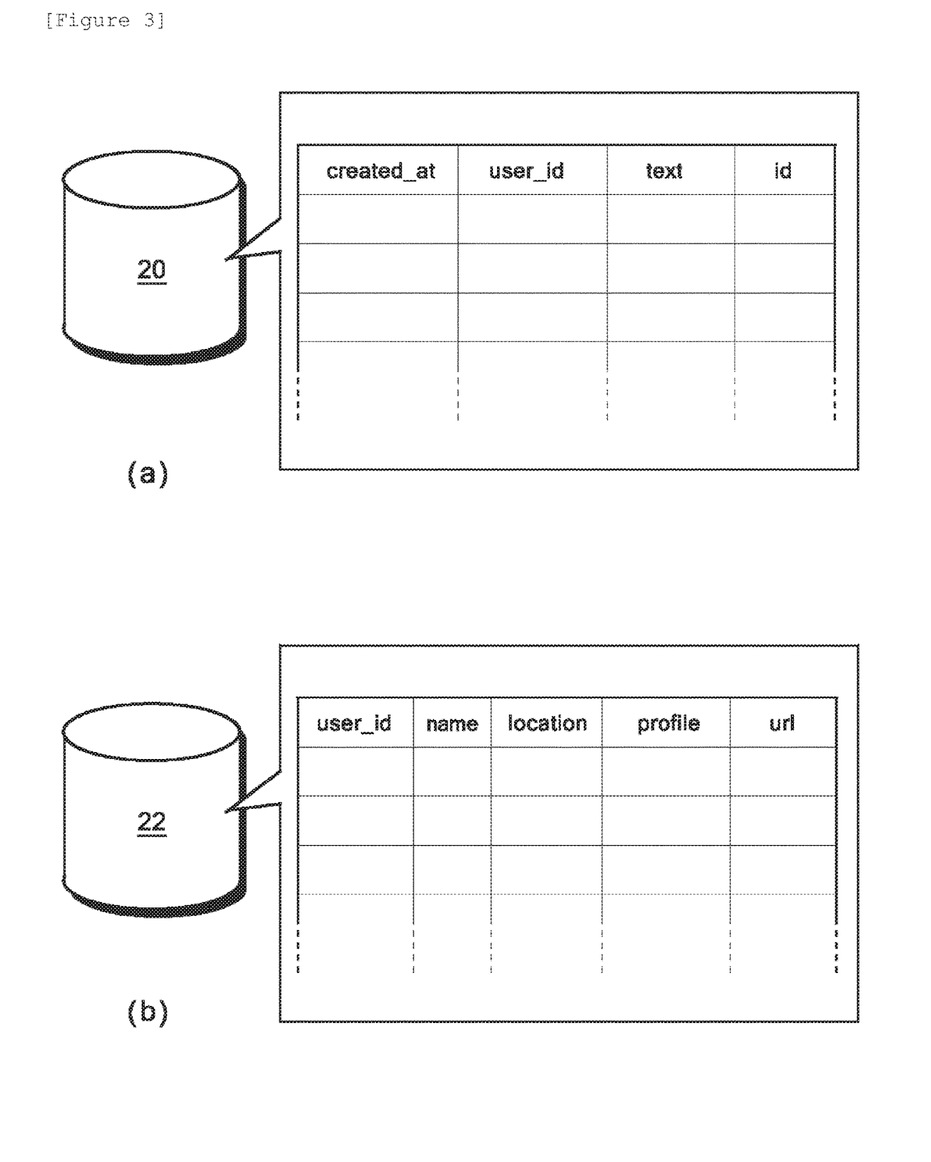
FIG. 3 is a diagram illustrating a data structure of data stored in a hard disk device in a microblog server.

FIG. 3 illustrates a data structure of data stored in hard disk devices 20 and 22 in the microblog server 2. A message table (FIG. 3(a)) stored in the hard disk device 20 includes a transmission time and date (created_at) indicating the time and date at which each message was sent, a message ID (id) identifying each message, a user ID (user_id) identifying a user who sent the message, and a text (text) which is the body of the message. Note that the number of characters in a text can be limited (for example up to 140 characters). A profile table (FIG. 3(b)) stored in the hard disk device 22, on the other hand, includes a user ID (user_id) identifying each user, a user name (name), a location of the user, such as a residence address or a business address of the user (location), profile information representing a profile of the user (profile), and URL information (url) which is the address of a webpage relating to the user. While the hard disk devices 20 and 22 are depicted as being separate devices, they may be configured as one integral device or may be distributed over a plurality of devices.

Figure 4:
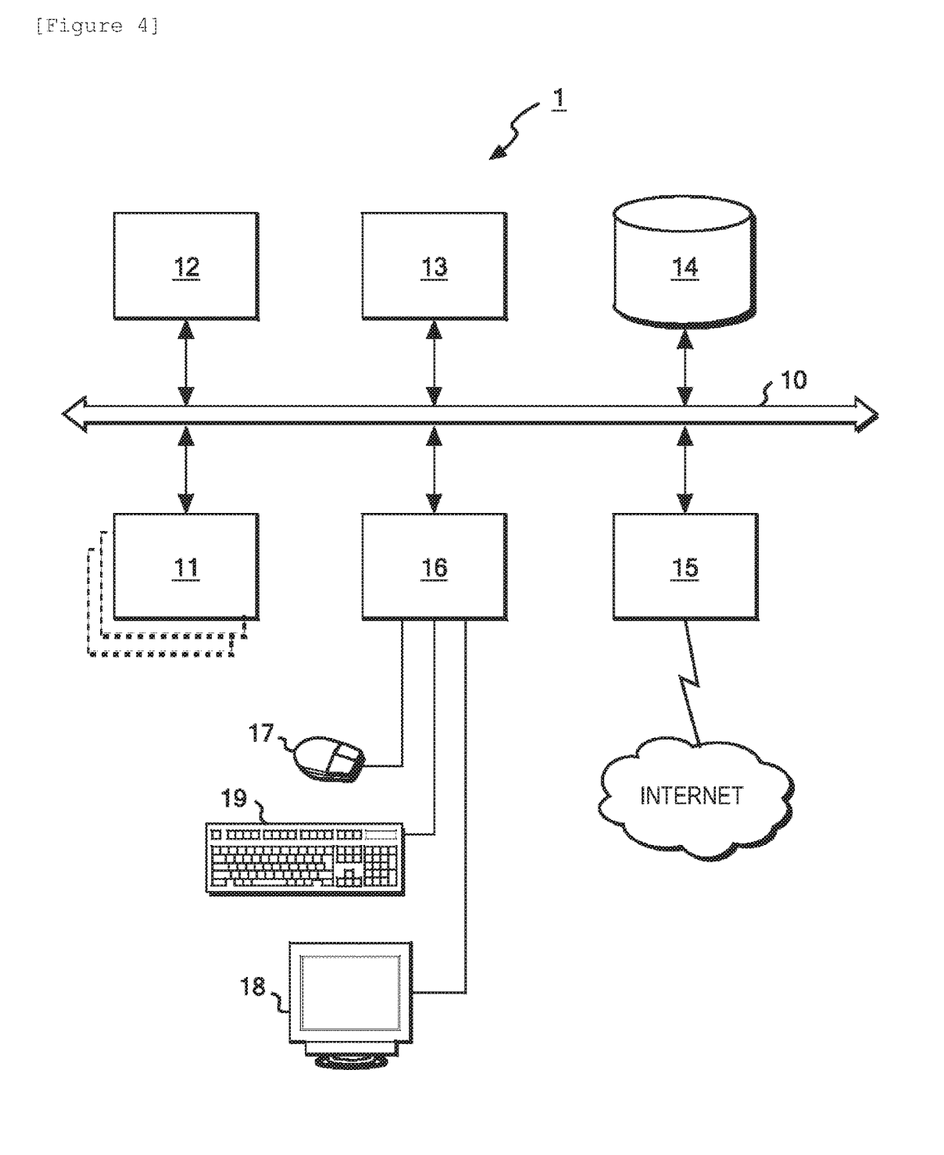
FIG. 4 is a block diagram illustrating a hardware configuration of a computer.

FIG. 4 is a block diagram illustrating a hardware configuration of a personal computer 1. The hardware configuration of the computer 1 includes a (low-speed and high-speed) bus 10 and a CPU (central processing unit) 11, a RAM (random access memory: storage device) 12, a ROM (read only memory: storage device) 13, an HDD (hard disk drive: storage device) 14, a communication interface 15, and an input and output interface 16, which are connected to the bus 10. The hardware configuration further includes a mouse 17, a flat-panel display (display device) 18 and a keyboard 19, which are connected to the input and output interface 16. While the computer 1 has been described as employing a typical personal computer architecture, the computer 1 can include multiple CPUs 11 and HDDs 14 in order to provide a higher data throughput and a higher availability, for example. Any of various other types of computer systems as well as a desktop computer can be used.

A software configuration of the computer 1 includes an operating system (OS) which provides basic functions, application software which uses the functions of the OS, and driver software for input and output devices. These pieces of software are loaded onto the RAM 12 along with various kinds of data and executed by the CPU 11, so that the computer 1 in its entirety functions as functional modules illustrated in FIG. 5 and performs processes illustrated in FIGS. 6 to 11.

Figure 5:
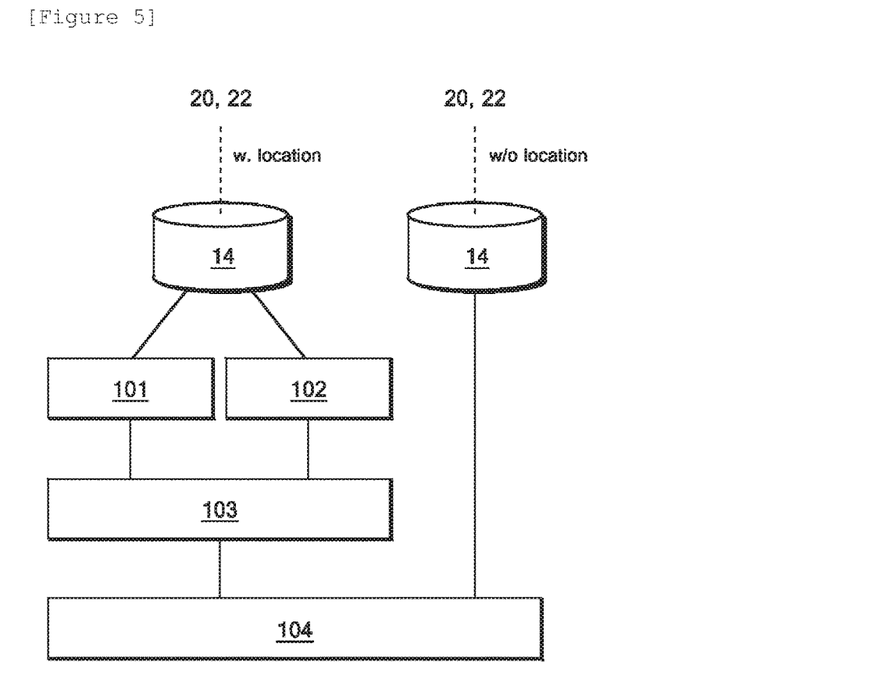
FIG. 5 is a block diagram illustrating functions of the computer.

FIG. 5 is a block diagram illustrating functional modules of a computer 1 relating to an embodiment. The computer 1 functions as a base distribution computation module 101, an event distribution computation module 102, a localization determination module 103, and a residence estimation module 104.

Figure 6:
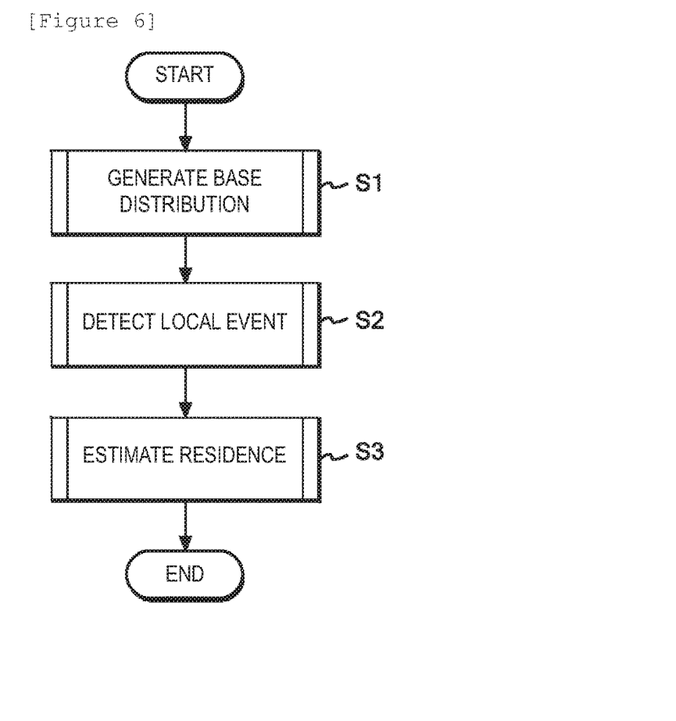
FIG. 6 is a basic flowchart illustrating a process performed by the computer.

FIG. 6 is a flowchart illustrating a process performed by the computer 1 relating to the embodiment. The process includes broadly a base distribution generation step (S1), a local event detection step (S2), and a residence estimation step (S3).

Figure 7:
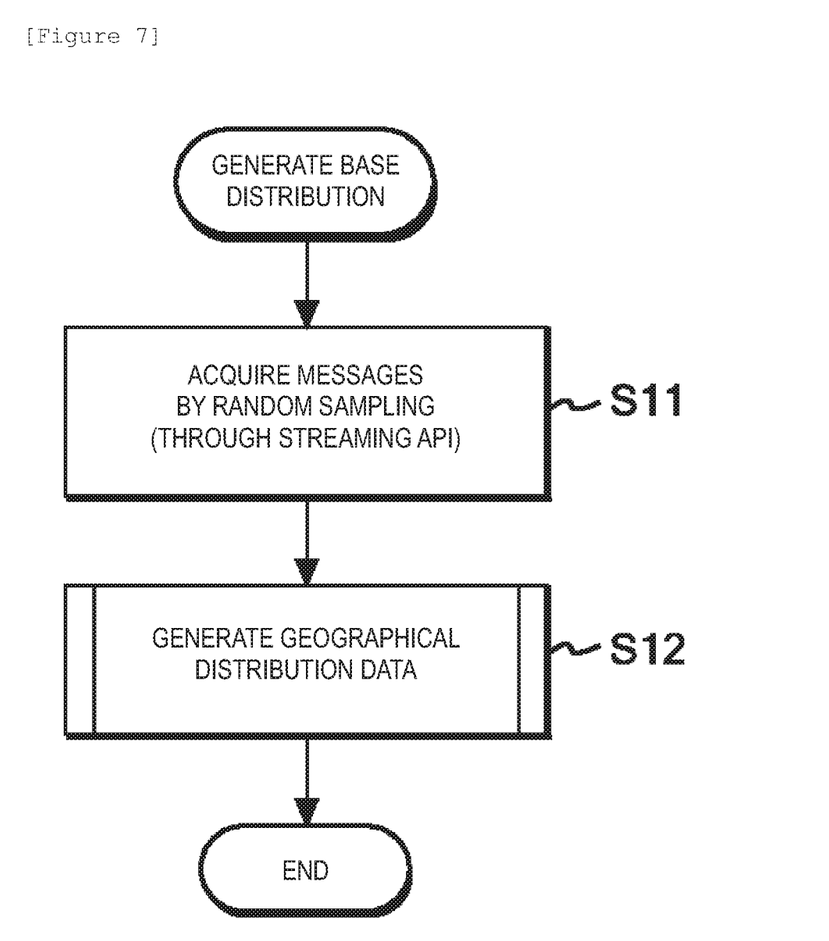
FIG. 7 is a flowchart illustrating a process for generating a base distribution.
Figure 8:
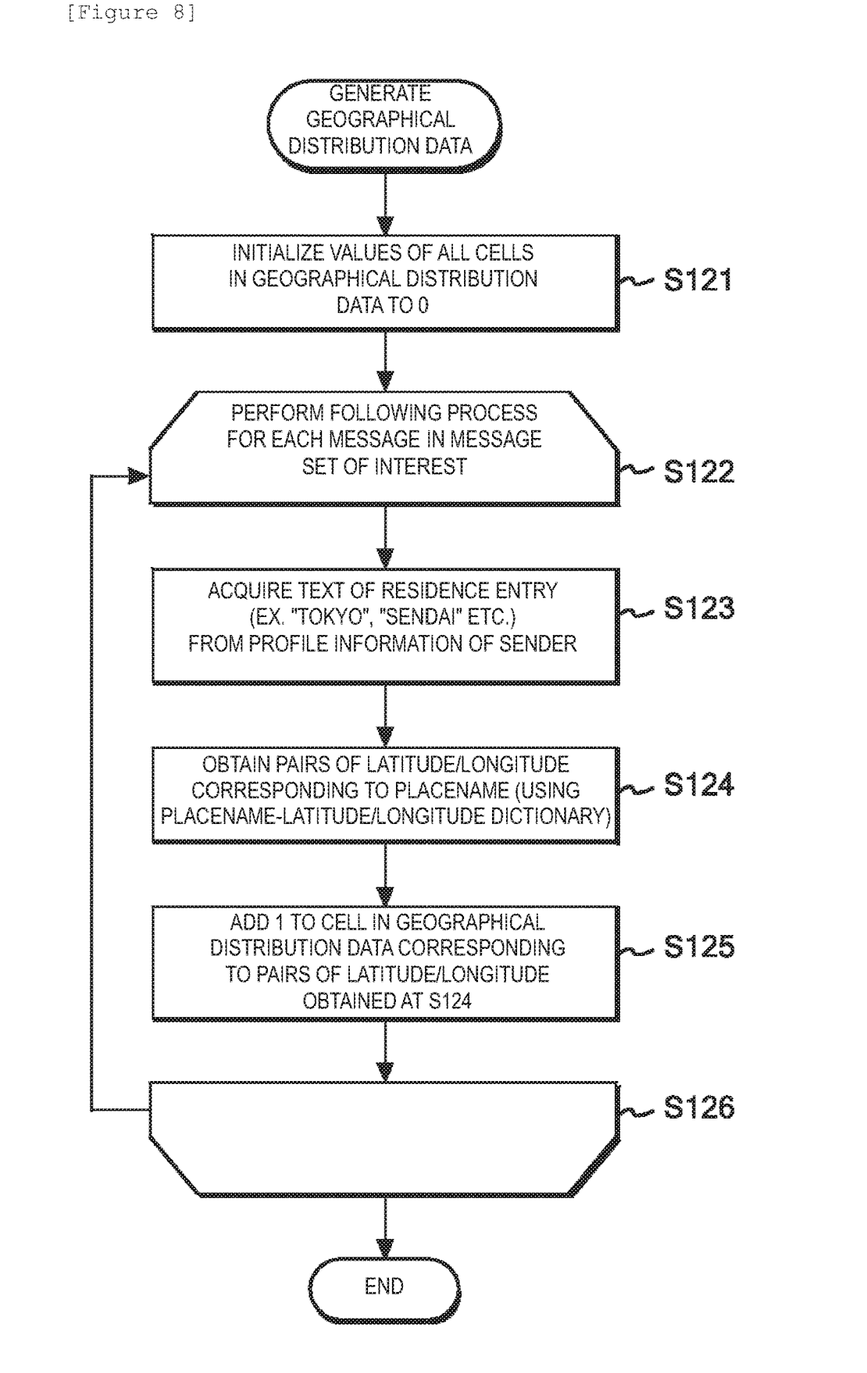
FIG. 8 is a flowchart illustrating a process for generating geographical distribution data.

FIGS. 7 and 8 are flowcharts illustrating the base distribution generation step (S1) in further detail. The base distribution computation module 101 uses an API to randomly acquire messages sent from users for whom some information has been input in a residence field in profile information (residence-identified users) from the microblog server 2 (S11). The base distribution computation module 101 then generates geographical distribution data based on the acquired messages (S12).

Figure 12:
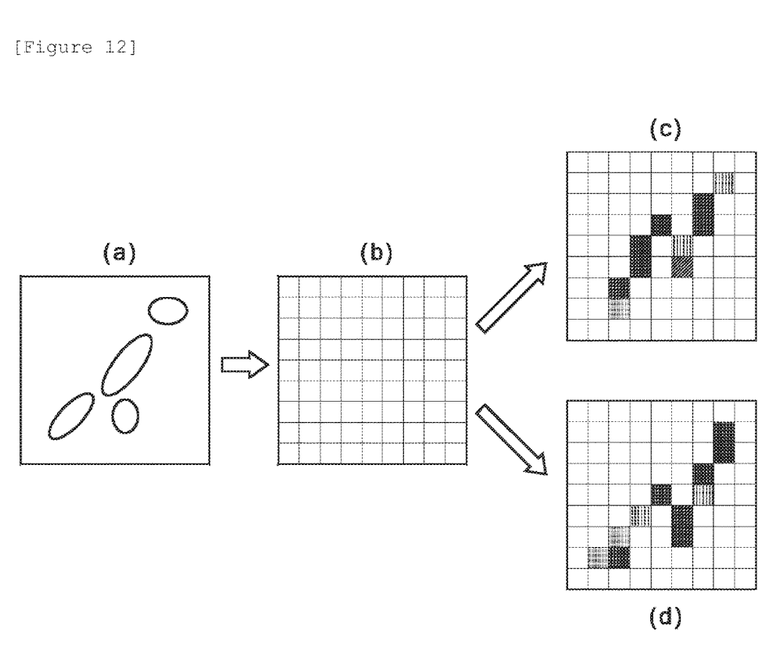
FIG. 12 is a schematic diagram illustrating a process of generating distribution data.

FIG. 8 is a flowchart illustrating a procedure for generating geographical distribution data. FIG. 12 is a conceptual diagram illustrating a process of generating geographical distribution data. The geographical distribution data is constructed by dividing an area of interest into a mesh. For example, an area (see FIG. 12(a)) from 30 degrees north latitude to 45 degrees north latitude and from 130 degrees east longitude to 145 degrees east longitude can be evenly divided into a mesh of 100×100 cells (see FIG. 12(b), where the number of cells does not agree with the number of cells given above). Here, a value can be assigned to each of the cells into which the area is divided. The size of a cell (the number of cells into which the area is evenly divided) can be set arbitrarily. First, the value of each cell is initialized to 0 (zero) (S121). Then, the process from steps S123 through S125 are performed to each of the messages in a message set of interest (here, a set of messages randomly selected from messages sent from residence-identified users (S11)) (S122, S126).

Specifically, a text filled in a residence field in the profile information of each sender is acquired (S123). Then, a placename-latitude/longitude dictionary is used to obtain the latitude/longitude corresponding to the acquired text (placename) (S124). Then, 1 is added to a value of a cell corresponding to the acquired latitude/longitude (S125).

Here, the level of detail of the texts (placenames) filled in the residence field in the profile information by the senders may vary. Differences in level of detail can be addressed as follows, for example. First, an appropriate level of administrative unit is determined in advance with respect to the size of each cell. Here, assume that city/ward is the appropriate level of administrative unit. Then, if a user has filled in a placename that is more specific (street name) than city/ward, a placename that is more general, namely a city/ward name, is used (the street name, which is a more specific placename, is discarded). If a user filled in only a placename that is more general (prefecture name) than city/ward, a more specific, representative city/ward name (for example a prefectural capital city/ward) is used. These manipulations can be reflected in an organization of a placename-latitude/longitude dictionary, which will be described below, in advance.

The placename-latitude/longitude dictionary, not depicted, is stored in the HDD 14 and is accessible to the base distribution computation module 101. It is assumed here that placenames and pairs of latitude/longitude are in a one-to-one relationship, like one placename corresponds to the latitude/longitude of the location of its city or ward government office, for example. However, they may be in a 1-to-N (a natural number) relationship. Furthermore, it is assumed here that pairs of latitude/longitude and cells to which addition is performed are in a one-to-one relationship, like one pair of latitude/longitude corresponds to one cell containing that pair of latitude/longitude. However, a value weighted according to the distance between an obtained pair of latitude/longitude and the latitude/longitude of the center of each cell may be assigned to one cell containing the obtained pair of latitude/longitude and a plurality of cells adjacent to that cell. Furthermore, while the placename-latitude/longitude dictionary is used here, a placename-cell dictionary, for example, may be provided in advance.

By repeating the process (from S123 through S125) on a set of randomly selected messages, a base distribution indicating a regional distribution of the area (see FIG. 12(c)) can be obtained. Specifically, as illustrated in FIG. 12(c), gray regions of the mesh represent that users relating to the regions (uses living or working there) have sent messages. Darker grays indicate that more messages have been sent.

Figure 9:
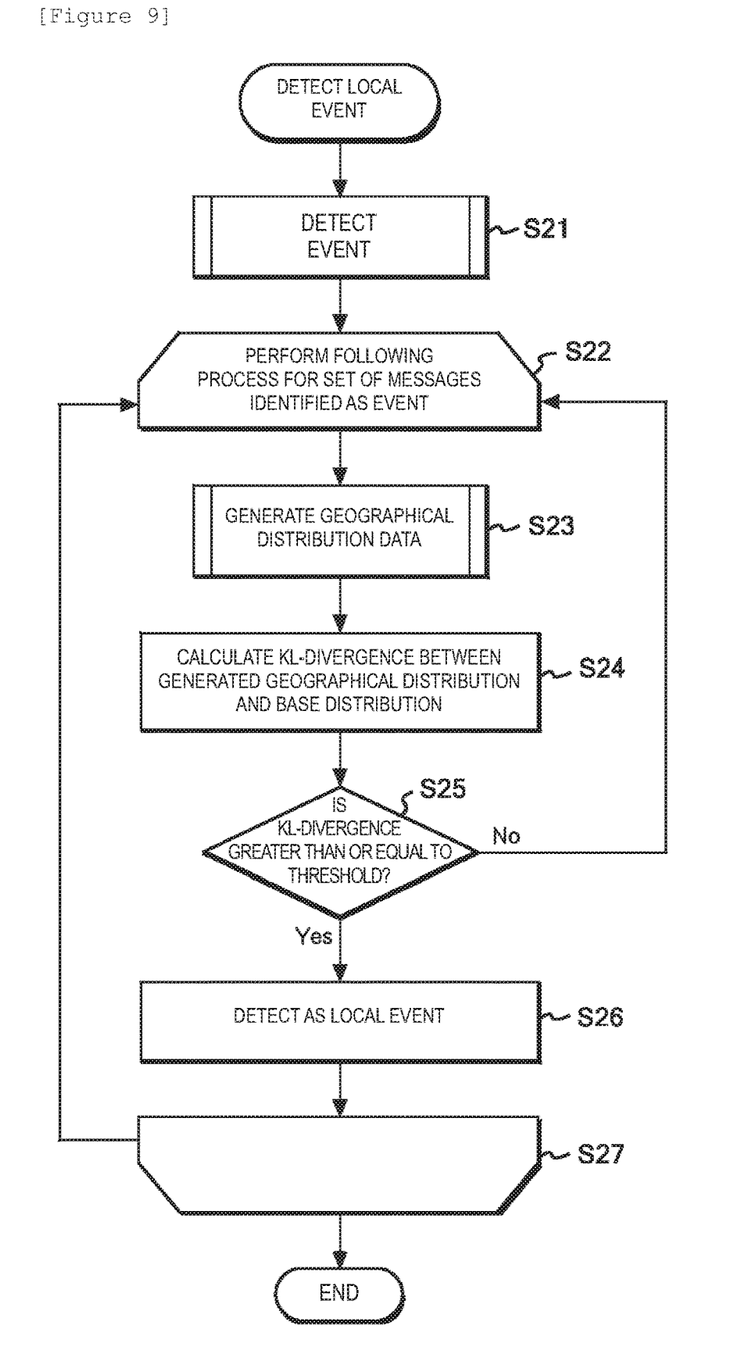
FIG. 9 is a flowchart illustrating a process for detecting a local event.
Figure 10:
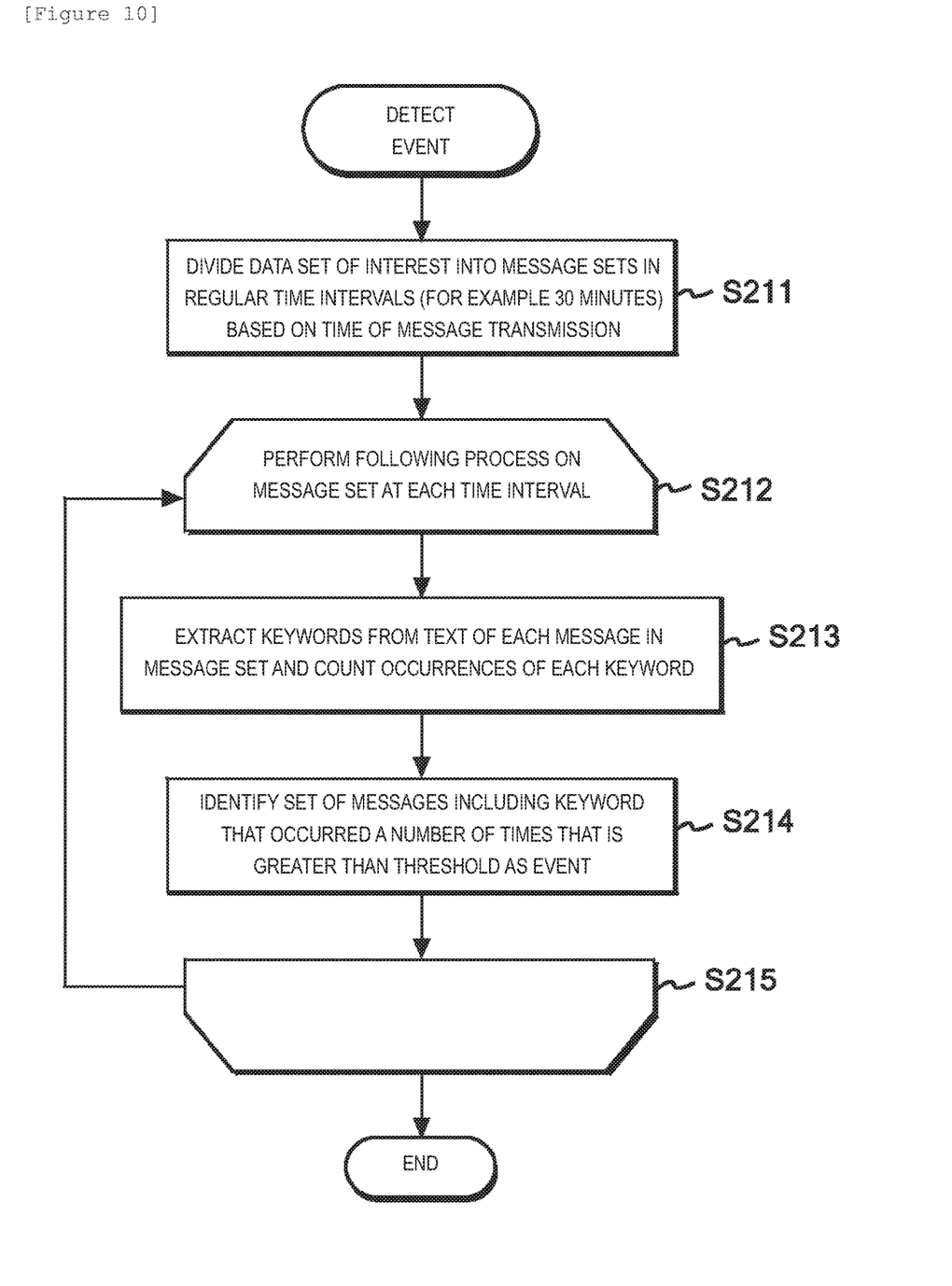
FIG. 10 is a flowchart illustrating a process for detecting an event.

FIGS. 9 and 10 are flowcharts illustrating the local event detection step (S2) in further detail. The event distribution computation module 102 first performs event detection (S21). Specifically, the event distribution computation module 102 uses an API to acquire messages sent from residence-identified users and divided into message sets in regular time intervals (for example 30 minutes) based on time of message transmission from residence-identified users from the microblog server 2 (S211). Then, the event distribution computation module 102 performs the following process (S212 and S215) on the message set acquired in each time interval. The event distribution computation module 102 extracts keywords from the bodies of the messages in each message set and counts occurrences of each of the keywords (S213). The event distribution computation module 102 identifies a set of messages including a keyword that occurred a number of times that is greater than a predetermined threshold as an "event" (for example 30) (S214).

Then, the event distribution computation module 102 and the localization determination module 103 perform the following process (S22 and S27) to the set of messages identified as an event.

First, the event distribution computation module 102 generates geographical distribution data based on the set of messages identified as an event (S23). As in the process illustrated in FIG. 8, the event distribution computation module 102 acquires a text filled in a residence field in the sender profile information in each of the messages in a message set of interest (here, the set of messages identified as an event) (see S123), uses the placename-latitude/longitude dictionary to obtain the latitude/longitude corresponding to the text (placename) acquired (see S124), and adds 1 to the cell corresponding to the obtained latitude/longitude (see S125). By repeating the process (S123 through S125) for the set of the messages identified as the event, a base distribution indicating a regional distribution of the messages can be obtained (see FIG. 12(d)). As a result, as illustrated in FIG. 12(d), the gray regions of the mesh represent that users relating to the regions (users living or working there) have sent messages identified as the event and darker grays indicates that more messages have been sent.

Then, the localization determination module 103 compares the event distribution thus computed (see FIG. 12(d)) with the base distribution described above (see FIG. 12(c)) and computes the KL-divergence between the two distributions (S24). Note that KL-divergence is a measure of the difference between two probability distributions. Details of a method for computing the KL-divergence is well known and therefore description of the KL-divergence will be omitted here. The localization determination module 103 then determines whether or not the value of the KL-divergence is greater than or equal to a predetermined threshold (for example 1.5) (S25) and, if the value is less than the threshold, applies the same process to a next set of messages identified as an event (S22). If the value is greater than or equal to the threshold, the localization determination module 103 identifies the set of messages as a local event (S26). Note that a weight can be assigned to each local event on the basis of the value of KL-divergence.

Figure 11:
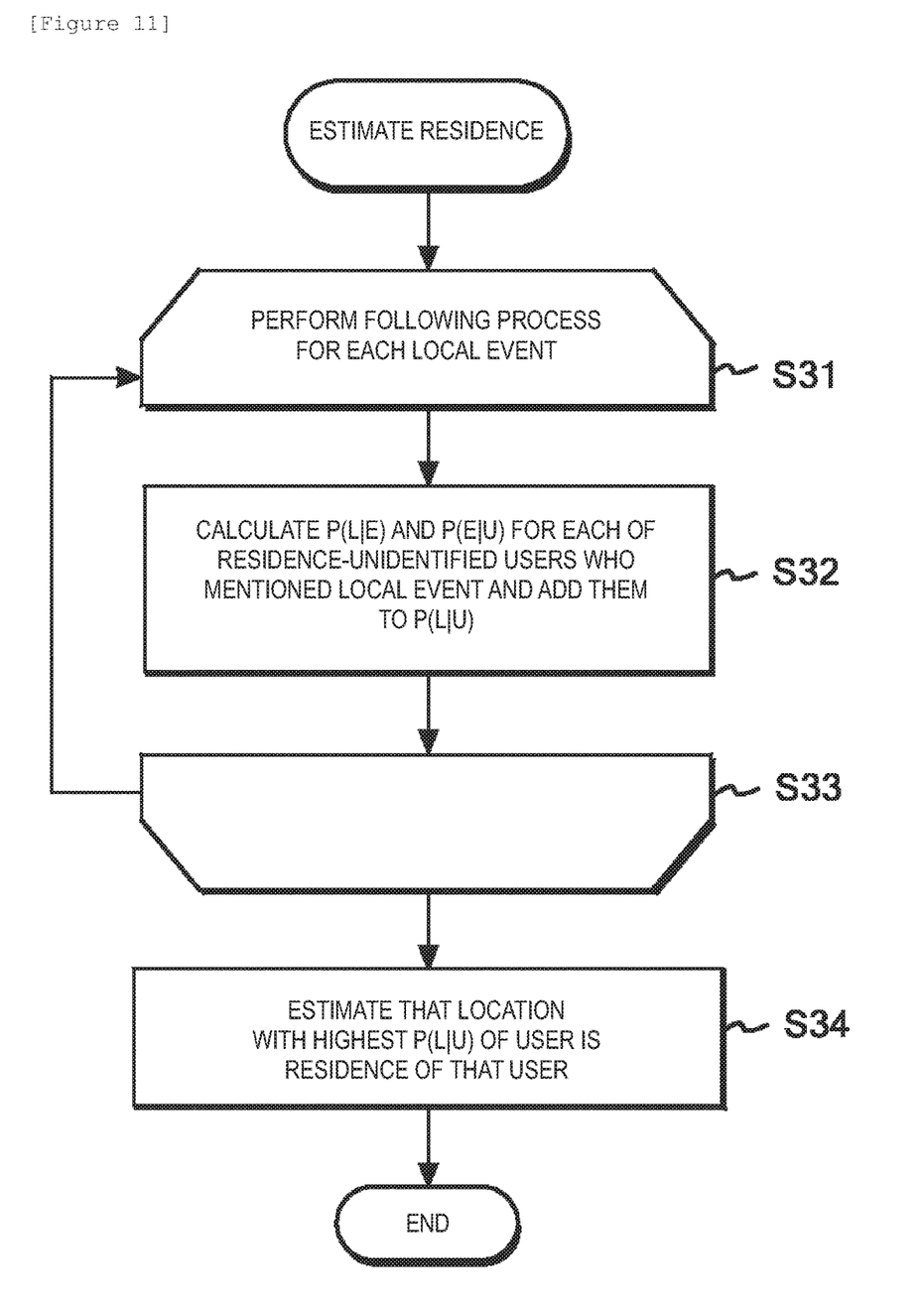
FIG. 11 is a flowchart illustrating a process for estimating a residence.

FIG. 11 is a flowchart illustrating the residence estimation step (S3) in further detail. The residence estimation module 104 repeats the following process for each local event (S31 and S33). Specifically, the residence estimation module 104 uses an API to acquire messages sent by users whose residence field in profile information does not contain information (residence-unidentified users) from the microblog server 2, computes $P(l|e)$ of Formula 5 and $P(e|u)$ of Formula 6 for each of users who sent a message in which a mention is made of a local event (a message that includes a keyword of a local event), and adds $P(l|e)$ and $P(e|u)$ to $P(l|u)$ in Formula 4 (S32). While whether or not a message relates to a local event is determined on the basis of whether or not the message contains a keyword of the local event here, a weight may be assigned to relation between a message and a local event on the basis of the number of keywords of the local event that appear in the message.

Estimation of the probability that the user $u$ is a resident of the location $l$: [Formula 4]

$$P(l|u) = \sum_e P(l|e) \cdot P(e|u)$$

The probability that the event $e$ particularly attracts attention of users living in the location $l$: [Formula 5]

$$P(l|e) = \sum_{u \in U_{known}} P_0(l|u) \cdot P(u|e)$$

where $U_{known}$ is a set of users whose residence has been identified and $$P_0(l|u) = \begin{cases} 1 & \text{iff } u\text{'s location profile is } l \\ c & \text{iff } u\text{'s location profile is unknown} \\ 0 & \text{iff } u\text{'s location profile is not } l \end{cases}$$

The probability that the user $u$ has made a mention of the event $e$: [Formula 6]

$$P(e|u) = \begin{cases} \frac{1}{|E_u|} & \text{iff } \exists t \in T_e \cdot t \text{ is posted by } u \\ 0 & \text{otherwise} \end{cases}$$

where $T_e$ is a message concerning the event $e$ and $E_u$ is an event sent by the user $u$.

The residence estimation module 104 estimates that the location with the highest probability in $P(l|u)$ of a user is the residence of the user (S34). Furthermore, the residence estimation module 104 can display the result on the display 18 or the like.

The present embodiment identifies a local event that attracts attention of users in a regionally localized area and estimates that a residence-unidentified user who has made a mention of that event is likely to be a resident of that region. Here, the term "event" means a set of message containing a keyword that has radically increased (burst) in occurrence in a time period and a local event is an event that is attracting attention of users in a particular region. A plurality of such local events are identified. That is, the embodiment uses residence-identified users who have made a mention of events to identify an event that is localized in a region, and estimates that a residence-unidentified user who has made a mention of a local event is likely to be a resident of that region. A user who has made a mention of a plurality of local events in a region is more likely to be a resident of that region.

The present invention can be implemented as a hardware embodiment in its entirety, a software embodiment as its entirety, or an embodiment embracing elements of both hardware and software. In a preferable embodiment, the present invention is implemented in software, including, but not limited to, firmware, resident software, microcode, and parser picocode.

Furthermore, the present invention can be implemented as a computer or any instruction executing system or a computer program including a program code or a computer-readable medium that is to be used in association with the computer or the instruction executing system. For purposes of illustration of the present invention, the computer-readable medium may be any device that is capable of containing, storing, communicating, bearing or transmitting a computer program to be used by any instruction executing system, apparatus or device or to be used in association with any instruction executing system, apparatus or device. Specifically, the parsing control module described above constitutes an instruction executing system in that sense or a "computer".

The medium may be an electric, magnetic, optical, electromagnetic, infrared, or semiconductor system (or apparatus or device) or bearing medium. Examples of the computer-readable medium includes a semiconductor or solid-state memory, a magnetic tape, a removable computer diskette, a random access memory (RAM), a read-only memory (ROM), a hard magnetic disk, and an optical disk. Examples of the optical disk at the time of writing include a compact disk read only memory (CD-ROM), a compact disk read/write (CD-RW) memory, and a DVD.

A data processing system suitable for storing and/or executing program codes may include at least one processor directly or indirectly connected to a memory element through a system bus. The memory element may include a cache memory that provides a temporary storage for at least some of the program codes in order to reduce the number of times of read operations required for reading a local memory and a bulk storage device used in the process of actual execution of the program codes and for reading the bulk storage device during execution.

REFERENCE SIGNS LIST

1 . . . Personal computer
11 . . . CPU (central processing unit)
12 . . . RAM (random access memory: storage device)
13 . . . ROM (read only memory: storage device)
14 . . . HDD (hard disk drive: storage device)
15 . . . Communication interface
16 . . . Input and output interface
17 . . . Mouse
18 . . . Flat-panel display (display device)
101 . . . Base distribution computation module
102 . . . Event distribution computation module
103 . . . Localization determination module
104 . . . Residence estimation module
2 . . . Microblog server
20, 22 . . . Hard disk drive
31 . . . Smartphone
32 . . . Tablet
33 . . . (Laptop) personal computer

What is claimed is:

1. A method for estimating association between a user in social media and a location, the method comprising the steps of:

acquiring, at a processor, a first content posted to the social media by a first user associated with a first location;
determining, by the processor, regional localization of the first content on a basis of the first location;
acquiring, by the processor, a second content posted to the social media by a residence unidentified second user not associated with a location;
determining, by the processor, the degree of a relationship between the first content and the second content; and
associating the first location with the second user on the basis of the localization and the degree of the relationship, wherein said associating the first location (l) with the second user comprises:
acquiring, by the processor, messages sent by said second users, and for each second user (u) having a message indicating a local event (e):
computing a first probability estimation $P(l|e)$ that the event attracts attention of first users living in the first location, the first users being of a set of users whose residence has been identified;
computing a second probability estimation $P(e|u)$ that the first users has indicated the local event in a message; and
computing a third probability estimation $P(l|u)$ that the second user is a resident of the first location wherein $P(l|u)$ is a function of said $P(l|e)$ and $P(e|u)$;
identifying a residence unidentified user among said second users having a largest estimated $P(l|u)$ probability;
determining the first location as a residence of said identified user; and
targeting a sales promotion to said second user in a region including said first location.

2. The method according to claim 1, wherein the step of determining the localization comprises the steps of:
computing a base distribution indicating a regional distribution of the first content randomly extracted;
computing an event distribution indicating a regional distribution of the first content relating to a particular event; and
determining regional localization of the first content on the basis of a difference between the base distribution and the event distribution.

3. The method according to claim 2, wherein the first content relating to the particular event is the first content including a particular keyword, the particular keyword being a keyword that has occurred a number of times in a given amount of time, the number of time being greater than a predetermined threshold.

4. The method according to claim 2, wherein the regional localization of the first content is computed using a KL-divergence between the base distribution and the event distribution.

5. The method according to claim 2, wherein the social media includes a profile associated with each user and the profile includes a location field, and
the step of computing the base distribution comprises the steps of:
acquiring a placename filled in the location field associated with a user who posted the first content randomly extracted;
referring to a placename dictionary indicating association between a placename and a pair of latitude and longitude to obtain a pair of latitude and longitude corresponding to the acquired placename on the basis of the acquired placename; and identifying a single cell corresponding to the acquired pair of latitude and longitude among a plurality of cells into which an area of interest is divided in advance.

6. The method according to claim 2, wherein the social media includes a profile associated with each user, the profile includes a location field, and the step of computing the event distribution comprises the steps of:
   acquiring a placename filled in the location field associated with a user who posted the first content relating to a particular event;
   referring to a placename dictionary indicating association between a placename and a pair of latitude and longitude to obtain a pair of latitude and longitude corresponding to the acquired placename on the basis of the acquired placename; and
   identifying a single cell corresponding to the obtained pair of latitude and longitude among a plurality of cells into which an area of interest is divided in advance.

7. The method according to claim 1, wherein the step of determining the degree of relationship determines: whether or not the first content and the second content are related to the same particular event, or whether or not the first content and the second content include the same particular keyword.

8. The method according to claim 1, wherein the step of associating associates the first location with the second user if the degree of the localization is greater than a predetermined threshold.

9. The method according to claim 1, wherein the step of associating associates more strongly the first location with the second user in response to the degree of the localization being greater.

10. The method according to claim 1, wherein the step of associating associates the first location with the second location if the degree of the relationship is greater than a predetermined threshold.

11. The method according to claim 1, wherein the step of associating associates more strongly the first location with the second user in response to the degree of the relationship being greater.

12. The method according to claim 1, further comprising the step of, in response to a plurality of the first locations being associated with one single second user, estimating that the first location most often associated with the second user is a second location associated with the second user.

13. The method according to claim 1, wherein the step of associating further comprises the step of:
   associating more strongly the first location with the second user in response to the degree of the relationship being greater and the degree of the localization being greater; and
   in response to a plurality of the first locations being associated with one single second user, estimating that the first location most often associated with the second user is a second location associated with the second user.

14. The method according to claim 1, wherein the probability $P(l|u)$ that the second user $u$ is associated with the first location $l$ is given by Formula 1, the probability $P(l|e)$ that a particular event $e$ attracts attention of the first user $u$ associated with the first location $l$ is given by Formula 2, and the probability $P(e|u)$ that the second user $u$ has made a mention of the event $e$ is given by Formula 3, where Estimation of the probability that the user $u$ is a resident of the location $l$: [Formula 1]

$$P(l|u) = \sum_{e} P(l|e) \cdot P(e|u)$$

The probability that the event $e$ particularly attracts attention of users living in the location $l$: [Formula 2]

$$P(l|e) = \sum_{u \in U_{known}} P_0(l|u) \cdot P(u|e)$$

where $U_{known}$ is a set of users whose residence has been identified and $$P_0(l|u) = \begin{cases} 1 & \text{iff } u\text{'s location profile is } l \\ c & \text{iff } u\text{'s location profile is unknown} \\ 0 & \text{iff } u\text{'s location profile is not } l \end{cases}$$

The probability that the user $u$ has made a mention of the event $e$: [Formula 3]

$$P(e|u) = \begin{cases} \frac{1}{|E_u|} & \text{iff } \exists t \in T_e \cdot t \text{ is posted by } u \\ 0 & \text{otherwise} \end{cases}$$

where $T_e$ is a message concerning the event $e$ and $E_u$ is an event sent by the user $u$.

15. A computer program product for estimating association between a user in social media and a location comprising:
   a computer-readable storage medium having computer-readable instructions stored therein, wherein the computer-readable instructions, when executed on a computer, causes the computer to perform:
   acquiring a first content posted to the social media by a first user associated with a first location;
   determining regional localization of the first content on a basis of the first location;
   acquiring a second content posted to the social media by a residence unidentified second user not associated with a location;
   determining the degree of a relationship between the first content and the second content; and
   associating the first location with the second user on the basis of the localization and the degree of the relationship, wherein said associating the first location (l) with the second user comprises:
   acquiring, by the processor, messages sent by said second users, and for each second user (u) having a message indicating a local event (e):
   computing a first probability estimation P(l|e) that the event attracts attention of first users living in the first location, the first users being of a set of users whose residence has been identified;
   computing a second probability estimation P(e|u) that the first users has indicated the local event in a message; and
   computing a third probability estimation P(l|u) that the second user is a resident of the first location wherein P(l|u) is a function of said P(l|e) and P(e|u);
   identifying a residence unidentified user among said second users having a largest estimated P(l|u) probability;
   determining the first location as a residence of said identified user; and
   targeting a sales promotion to said second user in a region including said first location.

16. The computer program product according to claim 15, wherein to perform the step of determining the localization, the computer-readable instructions, when executed on a computer, causes the computer to perform:
   computing a base distribution indicating a regional distribution of the first content randomly extracted;

computing an event distribution indicating a regional distribution of the first content relating to a particular event; and determining regional localization of the first content on the basis of a difference between the base distribution and the event distribution.

17. The computer program product according to claim 15, wherein the probability P(l|u) that the second user u is associated with the first location l is given by Formula 1, the probability P(l|e) that a particular event e attracts attention of the first user u associated with the first location l is given by Formula 2, and the probability P(e|u) that the second user u has made a mention of the event e is given by Formula 3, where Estimation of the probability that the user $u$ is a resident of the location $l$: [Formula 1]

$$P(l|u) = \sum_e P(l|e) \cdot P(e|u)$$

The probability that the event $e$ particularly attracts attention of users living in the location $l$: [Formula 2]

$$P(l|e) = \sum_{u \in U_{known}} P_0(l|u) \cdot P(u|e)$$

where $U_{known}$ is a set of users whose residence has been identified and $$P_0(l|u) = \begin{cases} 1 & \text{iff } u\text{'s location profile is } l \\ c & \text{iff } u\text{'s location profile is unknown} \\ 0 & \text{iff } u\text{'s location profile is not } l \end{cases}$$

The probability that the user $u$ has made a mention of the event $e$: [Formula 3]

$$P(e|u) = \begin{cases} \dfrac{1}{|E_u|} & \text{iff } \exists t \in T_e \cdot t \text{ is posted by } u \\ 0 & \text{otherwise} \end{cases}$$

where $T_e$ is a message concerning the event $e$ and $E_u$ is an event sent by the user $u$.

18. A computer-implemented system for estimating association between a user in social media and a location, the computer comprising:

a processor and a memory coupled to the processor, wherein the memory comprises instructions which, when executed by the processor, cause the processor to perform:

acquiring a first content posted to the social media by a first user associated with a first location;

determining regional localization of the first content on the basis of the first location;

acquiring a second content posted to the social media by a residence unidentified second user not associated with a location;

determining the degree of a relationship between the first content and the second content; and associating the first location with the second user on the basis of the localization and the degree of the relationship, wherein said associating the first location (l) with the second user comprises:

acquiring, by the processor, messages sent by said second users, and for each second user (u) having a message indicating a local event (e):

computing a first probability estimation P(l|e) that the event attracts attention of first users living in the first location, the first users being of a set of users whose residence has been identified;

computing a second probability estimation P(e|u) that the first users has indicated the local event in a message;

computing a third probability estimation P(l|u) that the second user is a resident of the first location wherein P(l|u) is a function of said P(l|e) and P(e|u):, identifying a residence unidentified user among said second users having a largest estimated P(l|u) probability;

determining the first location as a residence of said identified user; and targeting a sales promotion to said second user in a region including said first location.

19. The computer-implemented system according to claim 18, wherein to perform the step of determining the localization, the computer-readable instructions, when executed on a computer, causes the computer to perform:

computing a base distribution indicating a regional distribution of the first content randomly extracted;

computing an event distribution indicating a regional distribution of the first content relating to a particular event; and determining regional localization of the first content on the basis of a difference between the base distribution and the event distribution.

20. The computer-implemented system according to claim 18, wherein the probability P(l|u) that the second user u is associated with the first location l is given by Formula 1, the probability P(l|e) that a particular event e attracts attention of the first user u associated with the first location l is given by Formula 2, and the probability P(e|u) that the second user u has made a mention of the event e is given by Formula 3, where Estimation of the probability that the user $u$ is a resident of the location $l$: [Formula 1]

$$P(l|u) = \sum_e P(l|e) \cdot P(e|u)$$

The probability that the event $e$ particularly attracts attention of users living in the location $l$: [Formula 2]

$$P(l|e) = \sum_{u \in U_{known}} P_0(l|u) \cdot P(u|e)$$

where $U_{known}$ is a set of users whose residence has been identified and $$P_0(l|u) = \begin{cases} 1 & \text{iff } u\text{'s location profile is } l \\ c & \text{iff } u\text{'s location profile is unknown} \\ 0 & \text{iff } u\text{'s location profile is not } l \end{cases}$$

The probability that the user $u$ has made a mention of the event $e$: [Formula 3]

$$P(e|u) = \begin{cases} \dfrac{1}{|E_u|} & \text{iff } \exists t \in T_e \cdot t \text{ is posted by } u \\ 0 & \text{otherwise} \end{cases}$$

where $T_e$ is a message concerning the event $e$ and $E_u$ is an event sent by the user $u$.

where $T_e$ is a message concerning the event e and $E_u$ is an event sent by the user u.

* * * * *